United States Patent
Tyagi

(10) Patent No.: US 10,089,464 B2
(45) Date of Patent: *Oct. 2, 2018

(54) DE-OBFUSCATING SCRIPTED LANGUAGE FOR NETWORK INTRUSION DETECTION USING A REGULAR EXPRESSION SIGNATURE

(71) Applicant: Juniper Networks, Inc., Sunnyvale, CA (US)

(72) Inventor: Ankur Tyagi, Surat (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/237,221

(22) Filed: Aug. 15, 2016

(65) Prior Publication Data

US 2016/0357962 A1     Dec. 8, 2016

Related U.S. Application Data

(63) Continuation of application No. 14/501,798, filed on Sep. 30, 2014, now Pat. No. 9,419,991.

(51) Int. Cl.
*G06F 21/56* (2013.01)
*H04L 29/06* (2006.01)
(Continued)

(52) U.S. Cl.
CPC ............ *G06F 21/563* (2013.01); *G06F 8/427* (2013.01); *G06F 17/271* (2013.01);
(Continued)

(58) Field of Classification Search
None
See application file for complete search history.

(56) References Cited

U.S. PATENT DOCUMENTS 5,202,995 A * 4/1993 O'Brien ................. G06F 8/443
  717/160
7,757,215 B1 * 7/2010 Zhou .................... G06F 11/3644
  714/2

(Continued)

OTHER PUBLICATIONS

Extended European Search Report corresponding to EP 15 16 3565, dated Dec. 22, 2015, 6 pages.

*Primary Examiner* — Malcolm Cribbs
*Assistant Examiner* — Andrew J Steinle
(74) *Attorney, Agent, or Firm* — Harrity & Harrity, LLP

(57) ABSTRACT

A device receives data, identifies a context associated with the data, and identifies a script, within the data, associated with the context. The device parses the script to identify tokens, forms nodes based on the tokens, and assembles a syntax tree using the nodes. The device renames one or more identifiers associated with the nodes and generates a normalized text, associated with the script, based on the syntax tree after renaming the one or more identifiers. The device determines whether the normalized text matches a regular expression signature and processes the data based on determining whether the normalized text matches the regular expression signature. The device processes the data by a first process when the normalized text matches the regular expression signature or by a second process, different from the first process, when the normalized text does not match the regular expression signature.

20 Claims, 12 Drawing Sheets

(51) Int. Cl.
*G06F 17/27* (2006.01)
*G06F 8/41* (2018.01)
*G06F 9/455* (2018.01)

(52) U.S. Cl.
CPC .......... *G06F 21/562* (2013.01); *G06F 21/564* (2013.01); *G06F 21/566* (2013.01); *H04L 63/0245* (2013.01); *H04L 63/1416* (2013.01); *H04L 63/1425* (2013.01); *G06F 9/45529* (2013.01)

(56) References Cited

U.S. PATENT DOCUMENTS

| | | |
|---|---|---|
| 9,419,991 B2 | 8/2016 | Tyagi |
| 9,578,137 B1* | 2/2017 | Sham ................ H04L 29/08765 |
| 2002/0073330 A1 | 6/2002 | Chandnani et al. |
| 2005/0108554 A1 | 5/2005 | Rubin et al. |
| 2005/0172338 A1 | 8/2005 | Sandu et al. |
| 2007/0113282 A1* | 5/2007 | Ross ....................... G06F 21/52 726/22 |
| 2011/0197177 A1* | 8/2011 | Mony ...................... G06F 8/51 717/115 |
| 2012/0266244 A1* | 10/2012 | Green ................... G06F 21/566 726/24 |
| 2014/0130161 A1 | 5/2014 | Golovanov |
| 2015/0052507 A1* | 2/2015 | Ji ......................... G06F 8/4435 717/152 |

* cited by examiner

500 →

Interpret the normalized script in an emulated DOM and track function calls,
arguments, returned values, DOM tree, variable values, etc. in a trace

| | Flag | Action | Type | Indentifier | Value |
|---|---|---|---|---|---|
| 1 : | | init: | var | f1 | |
| 2 : | <*** | enter: | meth | createElement | <inline' |
| 3 : | | enter: | func | () | <inline> |
| 4 : | | init: | var | v1 | "ject" |
| 5 : | | init: | var | v2 | "ob" |
| 6 : | | exit: | func | () | "object" |
| 7 : | ***> | exit: | meth | createElement | new object |
| 8 : | | DOM | elem | object | <object></object> |
| 9 : | | init: | var | f1 | *new object |
| 10 : | <*** | enter: | meth | setAttribute | <inline> |
| 11 : | | enter: | func | () | <inline> |
| 12 : | | init: | var | v3 | "ssid" |
| 13 : | | init: | var | v4 | "a" |
| 14 : | | init: | var | v5 | "cl" |
| 15 : | | exit: | func | () | v5+v4+v3="cl"+"a"+"ssid"= "classid" |
| 16 : | | enter: | func | () | <inline> |
| 17 : | | init: | var | v6 | "7566" |
| 18 : | | init: | var | v7 | "7" |
| 19 : | | init: | var | v8 | "c" |
| 20 : | | init: | var | v9 | "6-2F5" |
| 21 : | | init: | var | v10 | "sid" |
| 22 : | | init: | var | v11 | "E-4BAF" |
| 23 : | | init: | var | v12 | "9" |
| 24 : | | init: | var | v13 | "-AC28-CF26AA" |
| 25 : | | init: | var | v14 | ":" |
| 26 : | | init: | var | v15 | "58" |
| 27 : | | init: | var | v16 | "636" |
| 28 : | | init: | var | v17 | ":55" |
| 29 : | | exit: | func | () | "clsid:55963676-2F5E-4BAF-AC28-CF26AA587566" |
| 30 : | ***> | exit: | meth | setAttribute | "classid", "clsid:55963676-2F5E-4BAF-AC28-CF26AA587566" |
| 31 : | | DOM | elem | object | classid="clsid:55963676-2F5E-4BAF-AC28-CF26AA587566"> |
| 32 : | | enter: | func | f1.url | <inline> |
| 33 : | <*** | enter: | meth | fromCharCode | 14 numeric values |
| 34 : | ***> | exit: | meth | fromCharCode | "http://badsite" |
| 35 : | | DOM | | | url="http://badsite" |

FIG. 5E

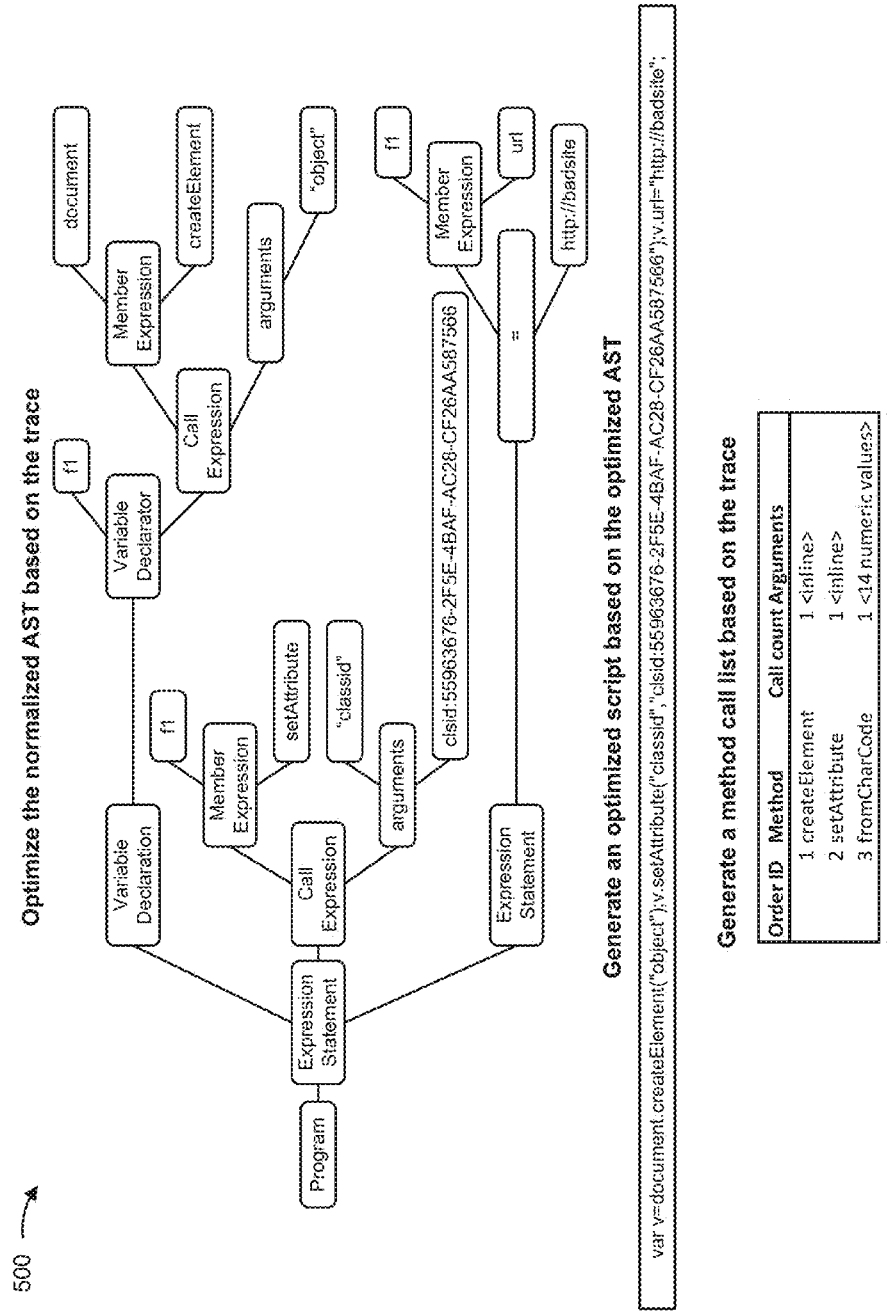

500

Determine whether the normalized script, without dynamic de-obfuscation, matches a regular expression signature

REGEX1=var f1=document.createElement\(\(function\(\){var var1=\['\]

| | |
|---|---|
| 1: | var f1=document.createElement((function(){var v1="ject",v2="ob";return v2+v1}())();f1.setAttribute((function(){var v3="ssid",v4="a",v5="cl";return v5+v4+v3}()),(function(){var v6="7566",v7="7",v8="c",v9="6-2F5",v10="sid",v11="E-4BAF",v12="9",v13="-AC28-CF26AA",v14="l",v15="58",v16="636",v17="55";return v8+v14+v10+v17+v12+v16+v7+v9+v11+v13+v15+v6}()));f1.uri=String.fromCharCode (104,116,116,112,58,47,47,98,97,100,115,105,116,101); |

⇨ Matches signature, so treat the data as having malicious script

Determine whether the normalized script, with dynamic de-obfuscation, matches a regular expression signature

REGEX2=559636676-2F5E-4BAF-AC28-CF26AA4587566    REGEX3=badsite var v=document.createElement("object");v.setAttribute("classid","clsid:559636676-2F5E-4BAF-AC28-CF26AA4587566");v.url="http://badsite";

⇨ Matches signature, so treat the data as having malicious script

Determine whether the method call list matches a regular expression signature

| Order ID | Method | Call count | Arguments |
|---|---|---|---|
| 1 | createElement | 1 | <inline> |
| 2 | setAttribute | 1 | <inline> |
| 3 | fromCharCode | 1 | <14 numeric values> |

⇨ Matches signature, so treat the data as having malicious script

REGEX4=fromCharCode [0-9]+ \<[0-9]+ numeric value

FIG. 5G

DE-OBFUSCATING SCRIPTED LANGUAGE FOR NETWORK INTRUSION DETECTION USING A REGULAR EXPRESSION SIGNATURE

RELATED APPLICATION

This application is a continuation of U.S. patent application Ser. No. 14/501,798, filed Sep. 30, 2014 (now U.S. Pat. No. 9,419,991), which is incorporated herein by reference.

BACKGROUND

A scripted language is high-level programming language that is interpreted at runtime rather than compiled. For example, scripting languages may be embedded within hypertext markup language ("HTML") and, when interpreted by a client and/or server, may add functionality to a web page. Scripted languages may also contain malicious code which, when interpreted, may compromise the security and/or integrity of the client and/or server.

SUMMARY

According to some possible implementations, a device may receive data, identify a context associated with the data, and identify a script, within the data, associated with the context. The device may parse the script to identify tokens, form nodes based on the tokens, and assemble a syntax tree using the nodes. The device may rename one or more identifiers associated with the nodes and generate a normalized text, associated with the script, based on the syntax tree after renaming the one or more identifiers. The device may determine whether the normalized text matches a regular expression signature and process the data based on determining whether the normalized text matches the regular expression signature. The device may process the data by a first process when the normalized text matches the regular expression signature or by a second process when the normalized text does not match the regular expression signature. The first process is different from the second process.

According to some possible implementations, a method may include receiving, by a device, data from an end-point device, extracting, by the device, scripted code from the data, and generating, by the device, a normalized script, having whitespace and identifiers, corresponding to the scripted code. The method may include formatting, by the device, the whitespace of the normalized script according to a normalizing scheme and renaming, by the device, the identifiers of the normalized script according to the normalizing scheme. The method may include determining, by the device, whether the normalized script matches a signature, and selectively sending, by the device, the data to another end-point device, associated with the data, based on determining, by the device, whether the normalized script matches the signature. The method may include sending, by the device, the data to the other end-point device based on determining that the normalized script does not match the signature or not sending, by the device, the data to the other end-point device based on determining that the normalized script matches the signature.

According to some possible implementations, a computer-readable medium storing instructions may include multiple instructions that, when executed by one or more processors associated with a device, cause the one or more processors to receive data, identify executable code contained in the data, execute the executable code within an environment, and generate a trace based on the execution of the executable code. The multiple instructions may further cause the one or more processors to generate, based on the trace, a list identifying one or more functions executed by the executable code and an order, execution count, argument, or return value associated with executing a function of the one or more functions. The multiple instructions may further cause the one or more processors to generate, based on the trace, an optimized code by replacing a portion of the executable code with an alternative portion, the portion and the alternative portion being equivalent with respect to interaction with the environment during execution. The multiple instructions may further cause the one or more processors to modify whitespace contained in the optimized code based on a whitespace normalizing scheme, modify identifiers contained in the optimized code based on an identifier normalizing scheme, and provide the optimized code, having the whitespace and the identifiers modified according to respective whitespace and identifier normalizing schemes, for matching against a code signature to determine whether the executable code is malicious. The code signature may be associated with determining whether the executable code is malicious. The multiple instructions may further cause the one or more processors to provide the list for matching against a list signature to determine whether the executable code is malicious. The list signature may be associated with determining whether the executable code is malicious.

BRIEF DESCRIPTION OF THE DRAWINGS

FIGS. 5A-5H are diagrams of an example implementation relating to the example process shown in FIG. 4.

DETAILED DESCRIPTION

Figure 1:
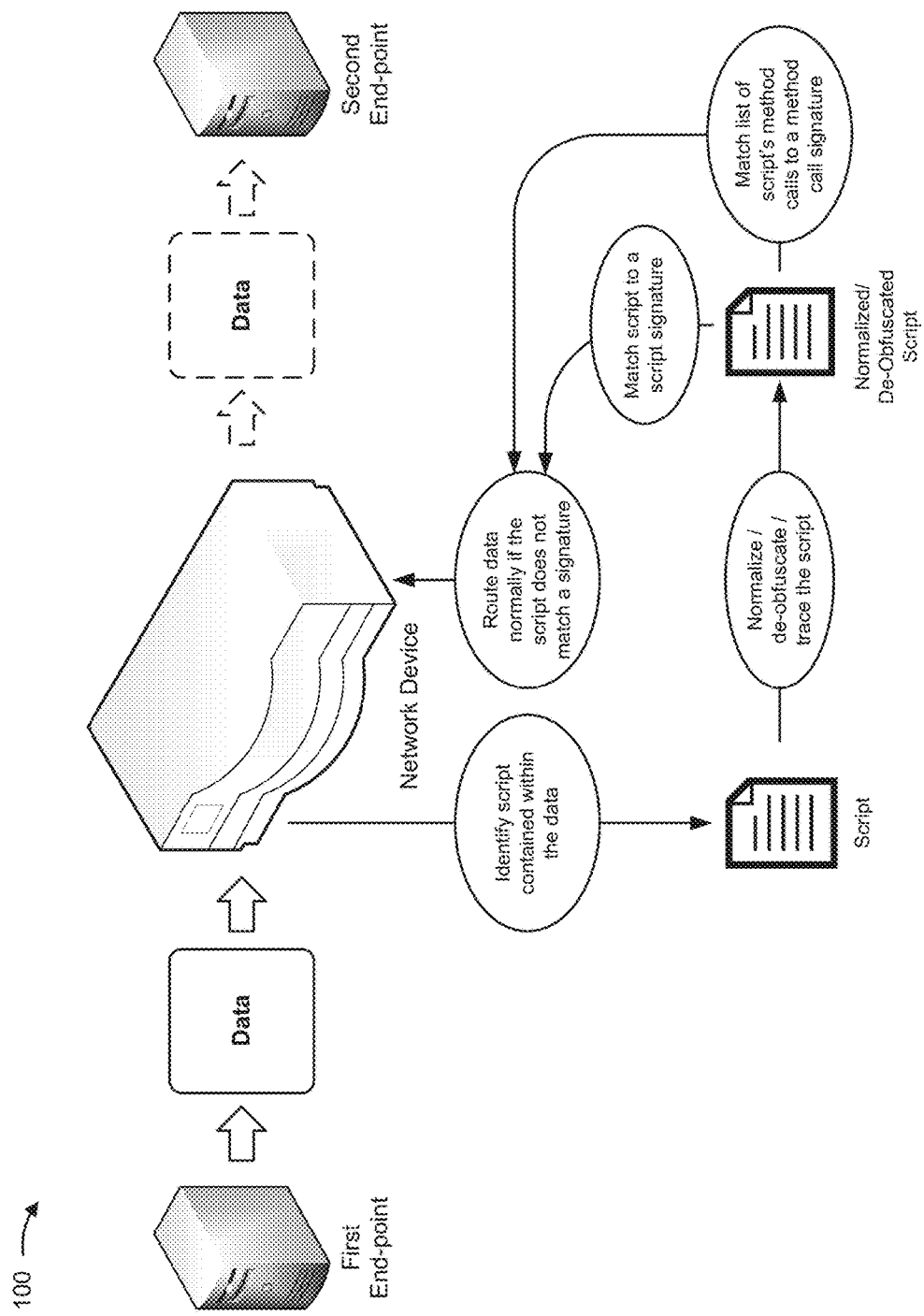
FIG. 1 is a diagram of an overview of an example implementation described herein.

The following detailed description of example implementations refers to the accompanying drawings. The same reference numbers in different drawings may identify the same or similar elements.

Numerous computing environments employ scripted languages, such as JavaScript, ECMAScript, VBScript, Python, Perl, PHP, etc., to provide functionality. In particular, scripted languages form a key component of dynamic hypertext markup language ("DHTML") and asynchronous JavaScript+XML ("AJAX"), which enable a user to enjoy an interactive and dynamic web browsing experience. Developers of mobile applications (e.g., for smart phones, tablets, and the like) may include scripts in their products. Unfortunately, the popularity of executable script has prompted certain individuals and actors to create and distribute malicious scripts whose purpose is to disrupt, hijack, and/or profit from a device which executes the script. These scripts may exploit a vulnerability in a device's software and/or hardware to automatically execute during a seemingly innocuous activity (e.g., by infecting a server trusted by the device and/or trusted by a user of the device), and/or the author(s) of the malicious script may trick the user into executing the malicious script, e.g., through social engineering. A malicious script may include, for example, a virus, malware, spyware, ransom-ware, information theft (e.g., sensitive session data associated with connection between two devices), or the like.

To further complicate matters, authors of malicious scripts ("script writers") commonly employ one or more obfuscation techniques to prevent detection by malware/antivirus scanners. For example, script writers may randomize whitespace and/or identifiers (e.g., names of private functions and/or variables), add bloat (e.g., a portion of the script which does not affect meaningful script behavior, such as a comment or a logic switch based on a known value—e.g., x=1; if (x==1) then { . . . }), use alternative means to represent constant values (e.g., replacing a number with a mathematical operation), use one function as a substitute for another (e.g., using a local function as an alias for a suspicious remote function or object method), split a string and concatenate the string at runtime, and/or encode a portion of the script and decode the portion at runtime. More than one obfuscation technique may be used in a particular script, and some techniques may be layered (e.g., encrypted content may be encrypted again using a different key). Additionally, script writers may use tools to randomize the use of obfuscation techniques so that a piece of malicious script may be presented in numerous different obfuscated forms.

Implementations described herein may assist a user in mitigating the threat posed by a malicious script by providing a method and device for intercepting script-containing data sent over a network to an end-point device associated with the user, normalizing and de-obfuscating the script contained within the data, comparing the normalized/de-obfuscated script to a regular expression signature associated with a malicious script, and preventing the script from being delivered to the end-point device if the script matches the signature. In this way, the user's end-point device, as well as other end-point devices associated with the network, may avoid infection by scripts already identified as malicious. Additionally, the method and device may assist a user in analyzing a script in order to determine whether the script is malicious and, if so, determine how to create a regular expression signature to direct the device to detect and detain the script.

FIG. 1 is a diagram of an overview of an example implementation 100 described herein. Assume, for example, that a first end-point sends data (e.g., using hypertext transfer protocol (HTTP)) to a second end-point. Prior to reaching the second end-point, the data passes through a network device (e.g., an intrusion detection and prevention system, a firewall, a proxy server, or the like). The network device identifies and extracts a script from within the data. The network device further normalizes, de-obfuscates, and traces the script in an emulated environment to generate a normalized/de-obfuscated script and a list of the script's calls to system/global/application programming interface (API) methods (e.g., functions which are not defined by the script but are provided by the environment to allow the script to interact with the environment). The network device then matches the normalized/de-obfuscated script to a signature (e.g., a regular expression) associated with a script and/or matches a list of the script's method calls to a signature associated with a list of method calls. If there is no match, then the network device may assume that the data is benign and route the data to the second end-point. If there is a match, the router may identify the script as a malicious script, may refuse to route the data to the second end-point, and/or may take some action in response to the detection of the malicious script.

In this way, the network device may protect the second end-point from a script which has previously been identified as malicious. Furthermore, the network device may prevent the further spread of the malicious script by refusing to route data which contains the malicious script and possibly alerting a user to the detection (e.g., through a log or email). By tracing the script and generating a list of the script's method calls, the network device may simplify the task of generating signatures for new threats.

Figure 2:
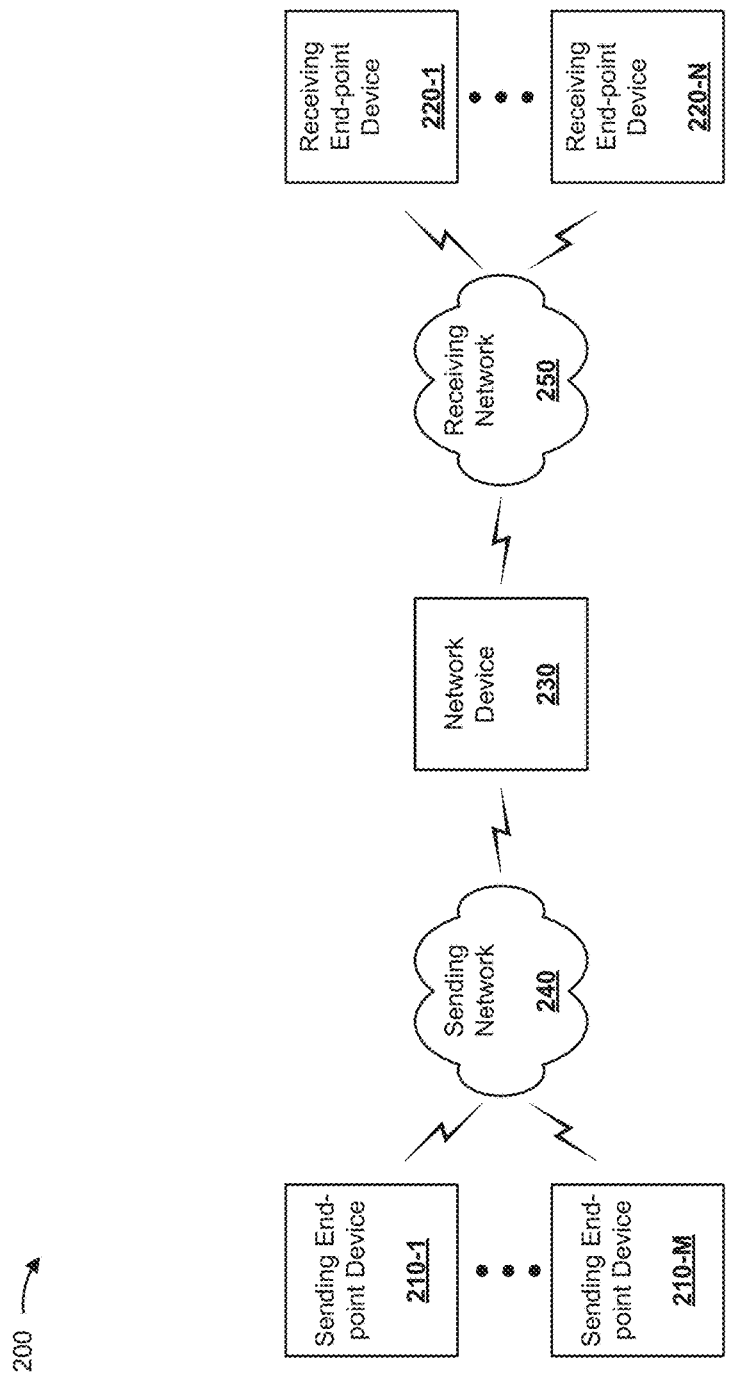
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a group of sending end-point devices 210-1, . . . , 210-M (M≥1) (hereinafter referred to collectively as "sending end-point devices 210" and individually as "sending end-point device 210"); a group of receiving end-point devices 220-1, . . . , 220-N(N≥1) (hereinafter referred to collectively as "receiving end-point devices 220" and individually as "receiving end-point device 220"); a network device 230; a sending network 240; and/or a receiving network 250. Devices of environment 200 may interconnect via wired connections, wireless connections, or a combination of wired and wireless connections.

Sending end-point device 210 and/or receiving end-point device 220 may include one or more devices capable of receiving and/or providing information over a network (e.g., sending network 240 and/or receiving network 250), and/or capable of generating, storing, and/or processing information received and/or provided over the network. For example, sending end-point device 210 and/or receiving end-point device 220 may include a computing device, such as a laptop computer, a tablet computer, a handheld computer, a desktop computer, a mobile phone (e.g., a smart phone, a radiotelephone, etc.), a network device (e.g., a router, a gateway, a firewall, a hub, a bridge, etc.), a server device, or a similar device. Sending end-point device 210 and/or receiving end-point device 220 may act as an end-point (e.g., a source and/or a destination) for a communication with another sending end-point device 210 and/or receiving end-point device 220. For example, a first sending end-point device 210 and/or receiving end-point device 220 may provide information to a second sending end-point device 210 and/or receiving end-point device 220 (e.g., via network device 230, sending network 240, and/or receiving network 250). For example, sending end-point device 210 may send, to receiving end-point device 220, data which contains one or more scripts.

Network device 230 may include one or more devices (e.g., one or more traffic transfer devices) capable of processing and/or transferring data between sending end-point devices 210 and/or receiving end-point devices 220. For example, network device 230 may include a firewall, a router, a gateway, a switch, a hub, a bridge, a reverse proxy, a server (e.g., a proxy server), a security device, an intrusion detection device, a load balancer, or a similar device. For example, network device 230 may selectively route data between sending end-point devices 210 and receiving end-point devices 220 based on determining whether script within the data matches a signature.

Sending network 240 and/or receiving network 250 may include one or more wired and/or wireless networks. For example, sending network 240 and/or receiving network 250 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or another type of network. While shown as separate networks, sending network 240 and receiving network 250 may be implemented as a single network.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
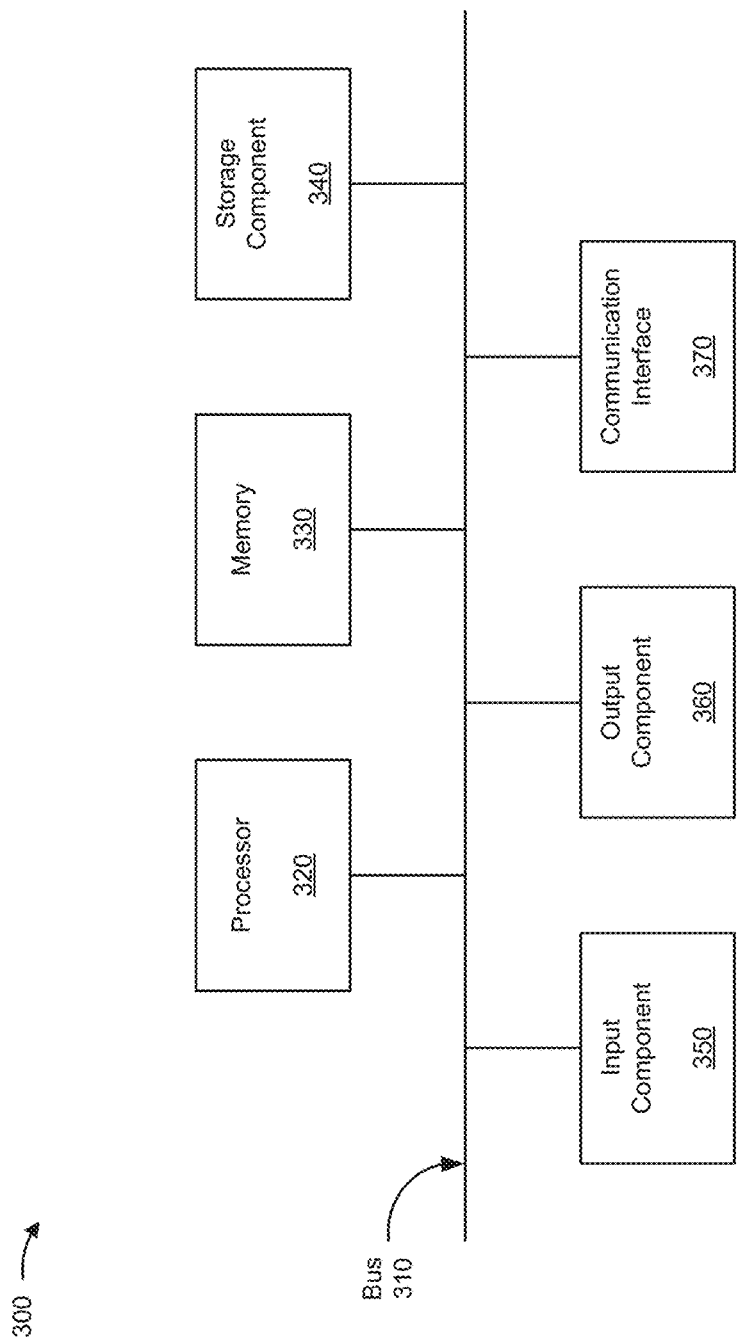
FIG. 3 is a diagram of example components of one or more devices of FIG. 2.

FIG. 3 is a diagram of example components of a device 300. Device 300 may correspond to sending end-point device 210, receiving end-point device 220, and/or a network device 230. In some implementations, sending end-point device 210, receiving end-point device 220, and/or a network device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
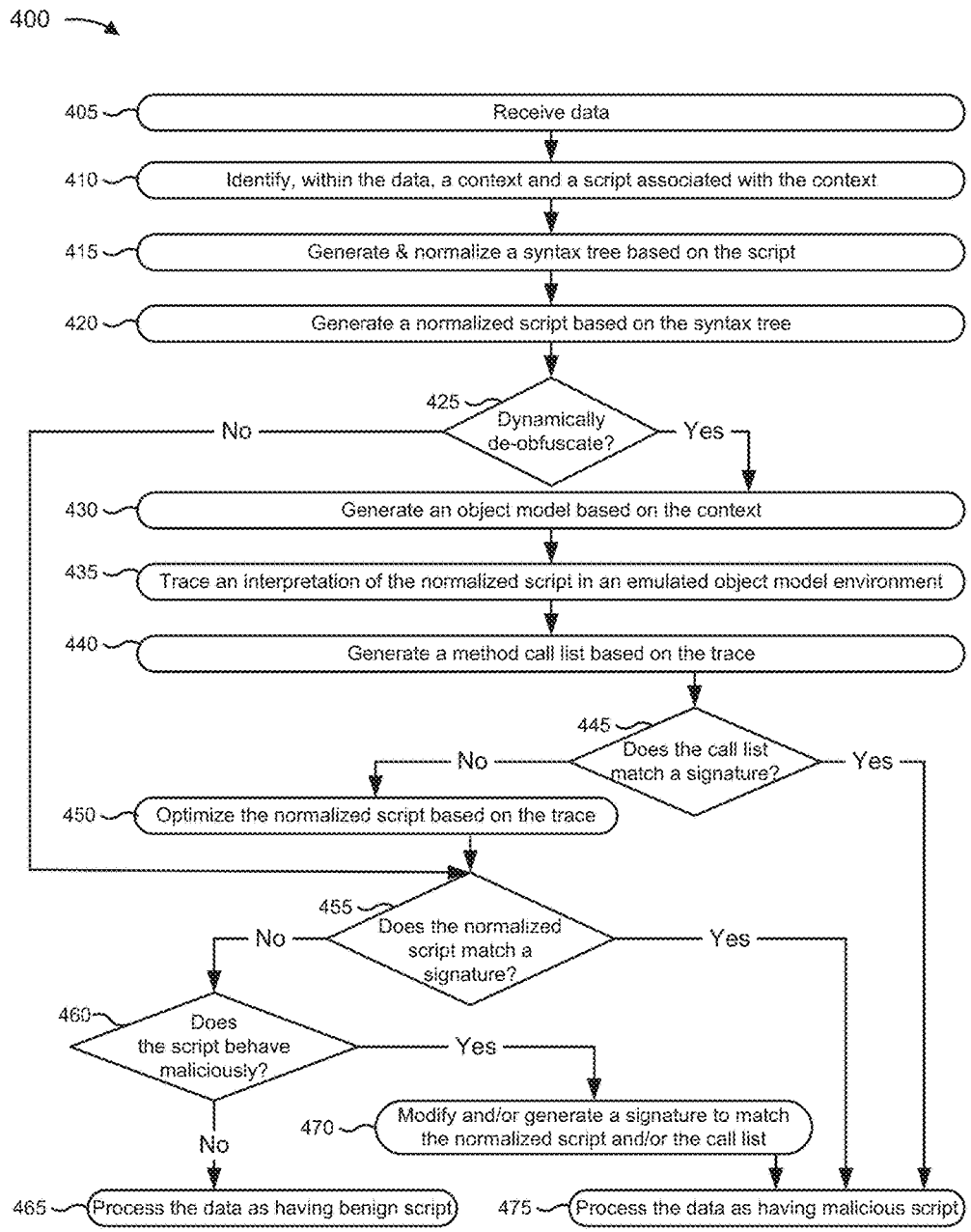
FIG. 4 is a flow chart of an example process for de-obfuscating scripted language for network intrusion detection using a regular expression signature.

FIG. 4 is a flow chart of an example process 400 for de-obfuscating scripted language for network intrusion detection using a regular expression signature. In some implementations, one or more process blocks of FIG. 4 may be performed by network device 230. In some implementations, one or more process blocks of FIG. 4 may be performed by another device or a group of devices separate from or including network device 230, such as sending end-point device 210 and/or receiving end-point device 220.

As shown in FIG. 4, process 400 may include receiving data (block 405). For example, network device 230 may receive data from sending end-point device 210 and/or receiving end-point device 220. Network device 230 may buffer the received data while performing further analysis. In this way, network device 230 may obtain data from which scripts may be extracted and analyzed.

As further shown in FIG. 4, process 400 may include identifying, within the data, a context and a script associated with the context (block 410). For example, a context may include data associated with a document (e.g., HTML, XML, PDF, E-MAIL), an application (e.g., a mobile/embedded application, web browser, or other script engine); or the like. The script may include embedded script, linked script from another source, or the like. In one example, the context may be an HTML web page having HTML elements, and the script may be a JavaScript element defined within a <script></script> tag. In this way, network device 230 may determine whether and/or how a script is to be matched to a signature.

As further shown in FIG. 4, process 400 may include generating and normalizing a syntax tree based on the script (block 415). For example, network device 230 may parse the script, identify valid tokens, and populate an abstract syntax tree ("AST") with nodes based on the identified tokens. Network device 230 may further normalize the syntax tree by renaming local identifiers (i.e., identifiers which may be changed without affecting the interpretation of the script) according to a normalized naming scheme based on the node structure (e.g., by numbering/ranking the nodes and replacing identifiers, associated with the nodes, with new identifiers having a normalized string pattern based on a number associated with the node and/or the type of node). Network device 230 may also remove whitespace while creating the syntax tree. For example, network device 230 may identify and delete any whitespace which is not necessary for parsing the script.

As further shown in FIG. 4, process 400 may include generating a normalized script based on the syntax tree (block 420). For example, network device 230 may traverse each node of the normalized syntax tree generated from the script and recode the script, as a normalized script, using the normalized naming scheme. Network device 230 may normalized the whitespace of the normalized script by using a particular whitespace insertion scheme (e.g., inserting a minimal amount of whitespace that preserves the syntactic structure of the script). By comparing the normalized script to similarly normalized script signatures, network device 230 may perform more accurate, identifier-independent matching to speed execution of a regular expression based signature matching algorithm.

As further shown in FIG. 4, process 400 may include determining whether to perform dynamic de-obfuscation (block 425). For example, network device 230 may determine whether to perform dynamic de-obfuscation based on configuration information identifying a condition or a set of conditions associated with performing dynamic de-obfuscation. For example, a condition may include a state of a Boolean flag which may be set to true or false, e.g., based on user input (e.g., in the case of analyzing new scripts to determine whether the new scripts are malicious). Additionally, or alternatively, a condition may include a level and/or indicia of obfuscation—such as satisfying an obfuscation level threshold. Network device 230 may, for example, determine the level and/or indicia of obfuscation based on a heuristic algorithm (e.g., by determining whether portions of script are likely to be encoded) or based on a preliminary signature matching (e.g., by determining whether the script matches one or more regular expression signatures associated with an obfuscation technique). Additionally, or alternatively, a condition may include availability of resources—such as processing power, network throughput/latency, and/or memory space. Additionally, or alternatively, a condition may be based on information included in and/or associated with the data, such as a sender, recipient, context, or the like. Alternatively, or additionally, network device 230 may determine to perform dynamic de-obfuscation of a script based on unsuccessfully attempting to match the script to a signature prior (e.g., as described in block 455) to performing dynamic de-obfuscation. Dynamic de-obfuscation may improve a level of de-obfuscation and therefore a likelihood of malicious script detection.

As further shown in FIG. 4, if dynamic de-obfuscation is to be performed (block 425=YES), then process 400 may include generating an object model based on the context (block 430). For example, network device 230 may identify an API and/or object model, which specifies how a script is to be interpreted and how the script may interact with its environment. Additionally, or alternatively, network device 230 may identify information contained within the data, such as elements, environment variables, or the like, with which the script may interact at runtime. For example, the object model may be an HTML document object model ("DOM") which includes various methods, properties, and rules associated with, e.g., a web browser environment. The DOM may include a DOM tree which maps data, e.g., HTML and/or scripting elements and values associated with the elements, contained within one or more HTML/XML/CSS files associated with the script. By generating an object model, network device 230 may prepare the emulator environment to trace the normalized script.

As further shown in FIG. 4, process 400 may include tracing an interpretation of the normalized script in an emulated object model environment (block 435). For example, network device 230 may employ a script interpreting/debugging engine which emulates the environment associated with the object model generated. If the object model is a DOM, then network device 230 may emulate, for example, a web browser environment. Alternatively, or additionally, the object model may correspond to a different context (e.g., PDF, e-mail, embedded/mobile application, or the like) and network device 230 may likewise emulate an object model associated with that environment. Alternatively, network device 230 may employ an emulation model which does not correspond to a specific environment but still uses local elements within the object model.

Network device 230 may substitute or implement alternative functions in place of system/global/potentially dangerous methods/functions. Alternatively, network device may interpret/execute the script in a sandboxed environment to observe the results of the script's execution and/or skip interpretation of portions of the script. Based on interpreting the script, network device 230 may generate a trace of events (e.g., function entry/exit points, arguments passed, values returned, calling of object methods/functions, interacting/modifying elements of the model, or changing values associated with script variables/object elements). The output from the trace provides network device 230 with information which would be unavailable or difficult to obtain by static analysis, and this information may be useful for de-obfuscating script, matching against a signature, and identifying behavior of the script when executed.

As further shown in FIG. 4, process 400 may include generating a method call list based on the trace (block 440). For example, network device 230 may identify, based on the trace, all calls/references to functions which interact with the object model (e.g., object methods). Network device 230 may further generate a method call list comprising an ordered list of all calls to those functions, a quantity of calls to those functions, as well as arguments passed to those functions. In this way, network device 230 may characterize the script in terms of the script's interaction with its environment.

As further shown in FIG. 4, process 400 may include determining if the call list matches a signature (block 445). For example, network device 230 may select a regular expression signature, from a list of regular expression signatures determined to match call lists associated with one or more malicious scripts, and determine whether the call list matches the regular expression signature. Network device 230 may repeat this matching process (e.g., iteratively) for one or more additional regular expression signatures to determine whether the call list matches a call list associated with one of the one or more additional regular expression signatures.

As further shown in FIG. 4, if the call list does not match a signature (block 445=NO), then process 400 may include optimizing the normalized script based on the trace (block 450). For example, network device 230 may identify and remove, from the normalized script, a portion of the normalized script which does not affect meaningful script behavior (e.g., dead code). Additionally, or alternatively, network device 230 may identify and remove superfluous logic-switches (e.g., loops based on a constant expression which will always, or never, be interpreted at runtime), alternatively represented constant values, functions which return constant values, split strings, or the like. Based on the trace, network device 230 may also decrypt encrypted portions of the script and identify substitute/alias functions. Network device 230 may perform this optimization in an iterative manner. Alternatively, or additionally, network device 230 may perform the optimization on the syntax tree which represents the script and create the optimized script from the syntax tree after optimizing the syntax tree.

As further shown in FIG. 4, process 400 may include determining whether the normalized script (with or without additional trace-based optimization) matches a signature (block 455). For example, network device 230 may select a regular expression signature, from a list of regular expression signatures determined to match one or more normalized malicious scripts, and determine whether the normalized script matches the regular expression signature. Network device 230 may repeat this matching process (e.g., iteratively) for one or more additional regular expression signatures to determine whether the normalized script matches a malicious script associated with one of the one or more additional regular expression signatures.

As further shown in FIG. 4, if the normalized script does not match a signature (block 455=NO), then process 400 may include determining whether the script behaves maliciously (block 460). For example, network device 230 may determine (e.g., based on user input, the trace, the call list, the optimized/normalized script, and/or a condition identified in the configuration information) whether the script behaves maliciously despite not having matched a known signature. For example, network device 230 may identify, based on the trace, one or more interactions between the script and the emulated object model environment which are associated with one or more malicious behaviors (e.g., based on a heuristic model).

As further shown in FIG. 4, if the normalized script does not behave maliciously (block 460=NO), then process 400 may include processing the data as having a benign script (block 465). For example, network device 230 may implement/execute/store the received data and/or route the data to its intended recipient.

As further shown in FIG. 4, if the normalized script behaves maliciously (block 460=YES), then process 400 may include modifying and/or generating one or more signatures to match the normalized script and/or the call list (block 470). For example, network device 230 may assist a user in developing a new signature, and/or modifying an existing signature, for a new form of malicious script by providing the user with a portion of the data containing the script, the normalized/optimized script, the trace, and/or the call list. Additionally, or alternatively, network device 230 may automatically (e.g., without requiring input from a user) generate a new signature, and/or modify an existing signature, to identify the script as malicious. In this way, network device 230 may update existing signatures and/or create new signatures to identify scripts as being malicious.

As further shown in FIG. 4, if the normalized script or the call list matches a signature (block 445=YES or block 455=YES) or the script behaves maliciously (block 460=YES), then process 400 may include processing the data as having a malicious script (block 475). For example, network device 230 may delete, quarantine, or otherwise prevent the execution, access, and/or transfer of the data to another device (e.g., to a receiving end-point device 220 associated with analyzing and/or processing a malicious script). Additionally, or alternatively, network device 230 may notify a user about the detection of a malicious script (e.g., through an e-mail, log entry, and/or other message meant for access by/display to a user/device). Additionally, or alternatively, network device 230 may generate one or more additional signatures for matching subsequent data received by network device 230. For example, network device 230 may generate a signature for matching data associated with a particular network, device, protocol, content, and/or user (e.g., to isolate the receiving network 250 from a particular sending end-point 210).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5H are diagrams of an example implementation 500 relating to example process 400 shown in FIG. 4. FIGS. 5A-5H show an example of a process for de-obfuscating scripted language for network intrusion detection using a regular expression signature.

Figure 5A:
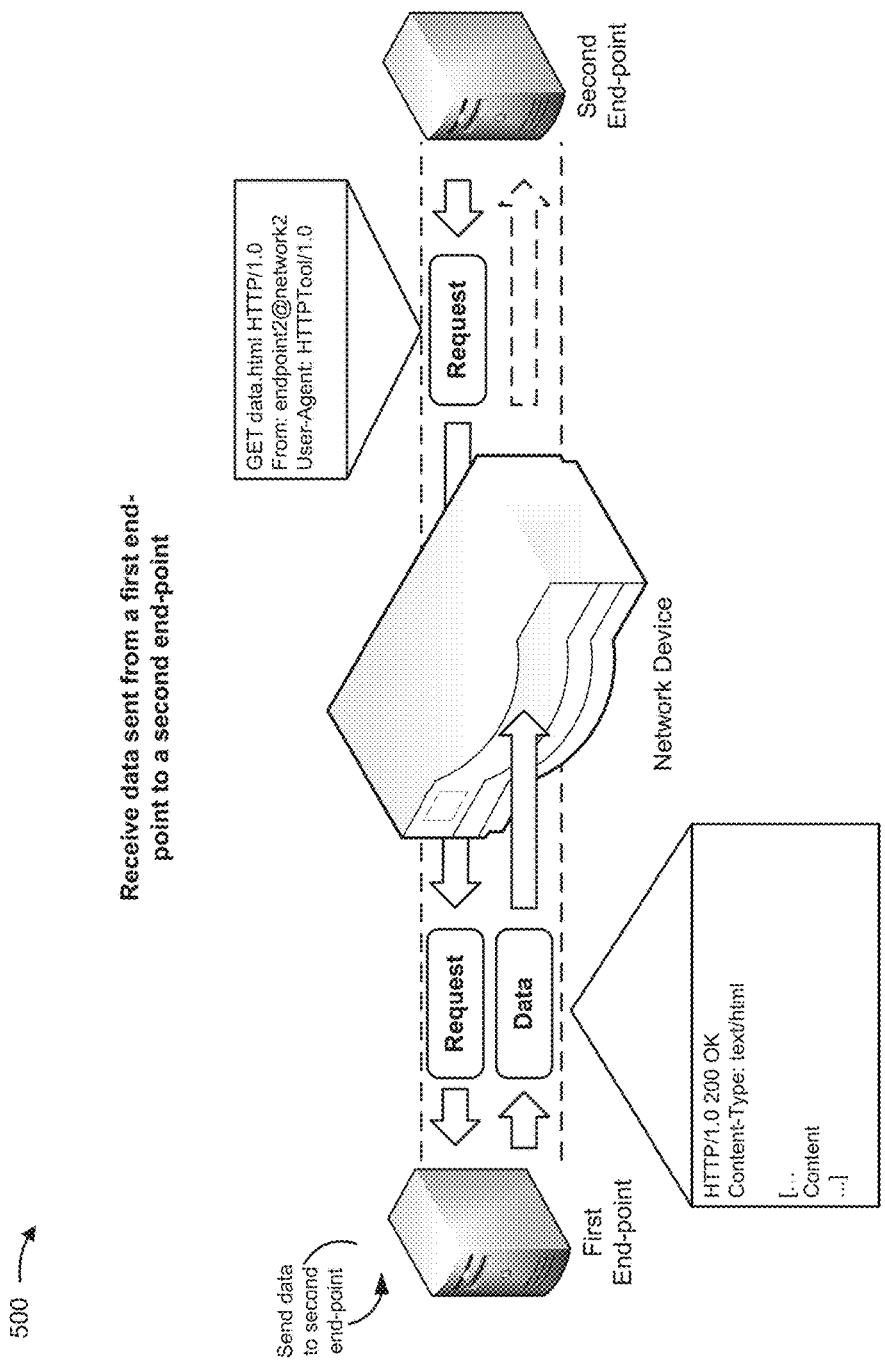

As shown in FIG. 5A, assume, for example implementation 500, that a first end-point (e.g., sending end-point device 210) sends, to a second end-point (e.g., receiving end-point device 220), HTTP data ("HTTP/1.0 200 OK|Content-Type: text/html" and additional content) in response to an HTTP request from receiving end-point device 220 ("GET data.html HTTP/1.0|From: endpoint2@network2|User-Agent: HTTPTool/1.0"). Assume further that a network device (e.g., network device 230) is positioned at a network location between the first end-point and the second end-point. Assume further that the network device intercepts and analyzes data passing between the first end-point and the second end-point as part of an intrusion detection and prevention system. In this way, the network device may receive data passing between the first end-point and the second end-point to determine whether the data contains malicious scripting language.

Figure 5B:
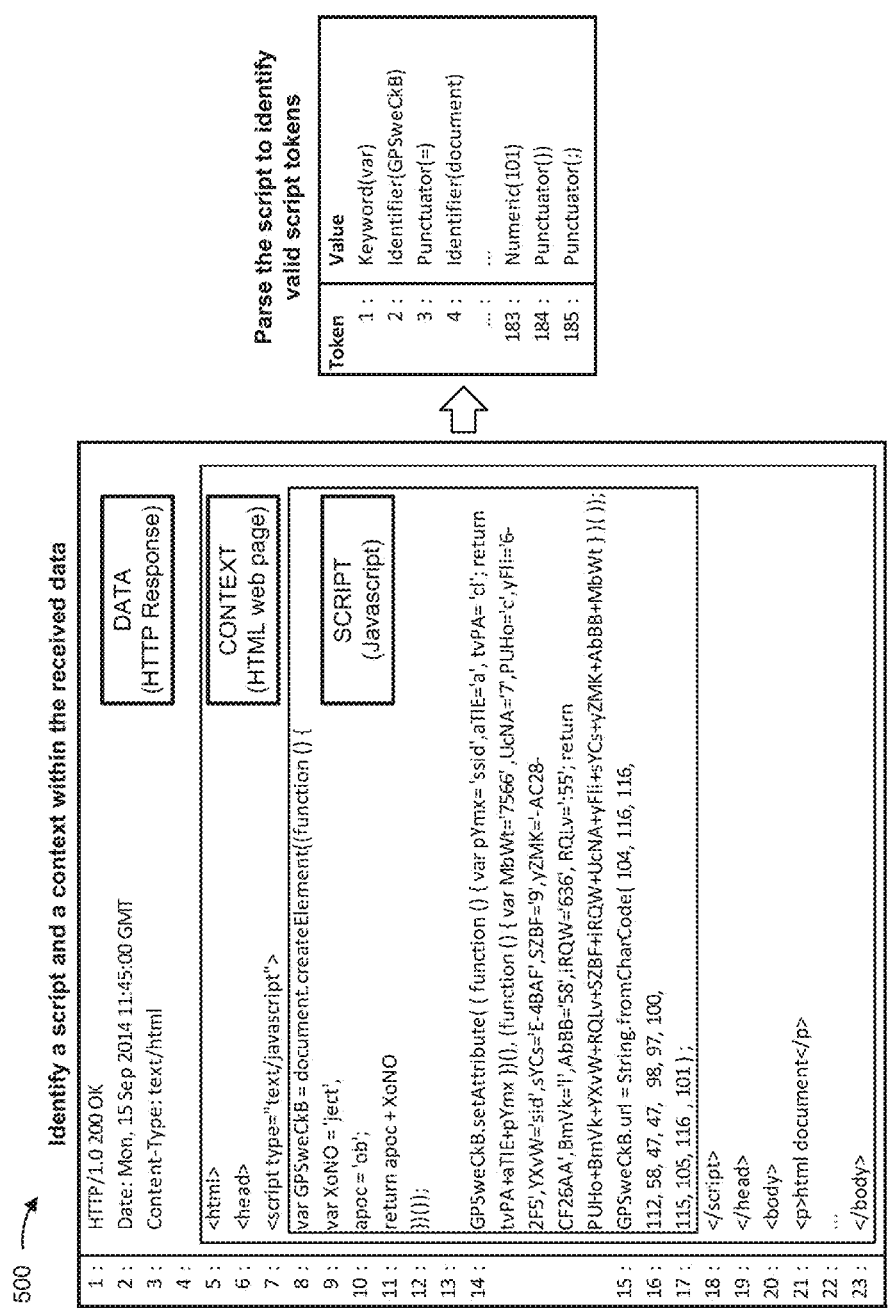

As shown in FIG. 5B, assume, for example implementation 500, that the network device identifies script (JavaScript) and a context associated with the script (a HTML web page) contained within the data (the HTTP response received from the first end-point device). Assume further that the network device uses a suitable parser to identify valid script tokens (keywords, identifiers, punctuators, literals, and the like). In this way, the network device may begin to normalize the script for identification.

Figure 5C:
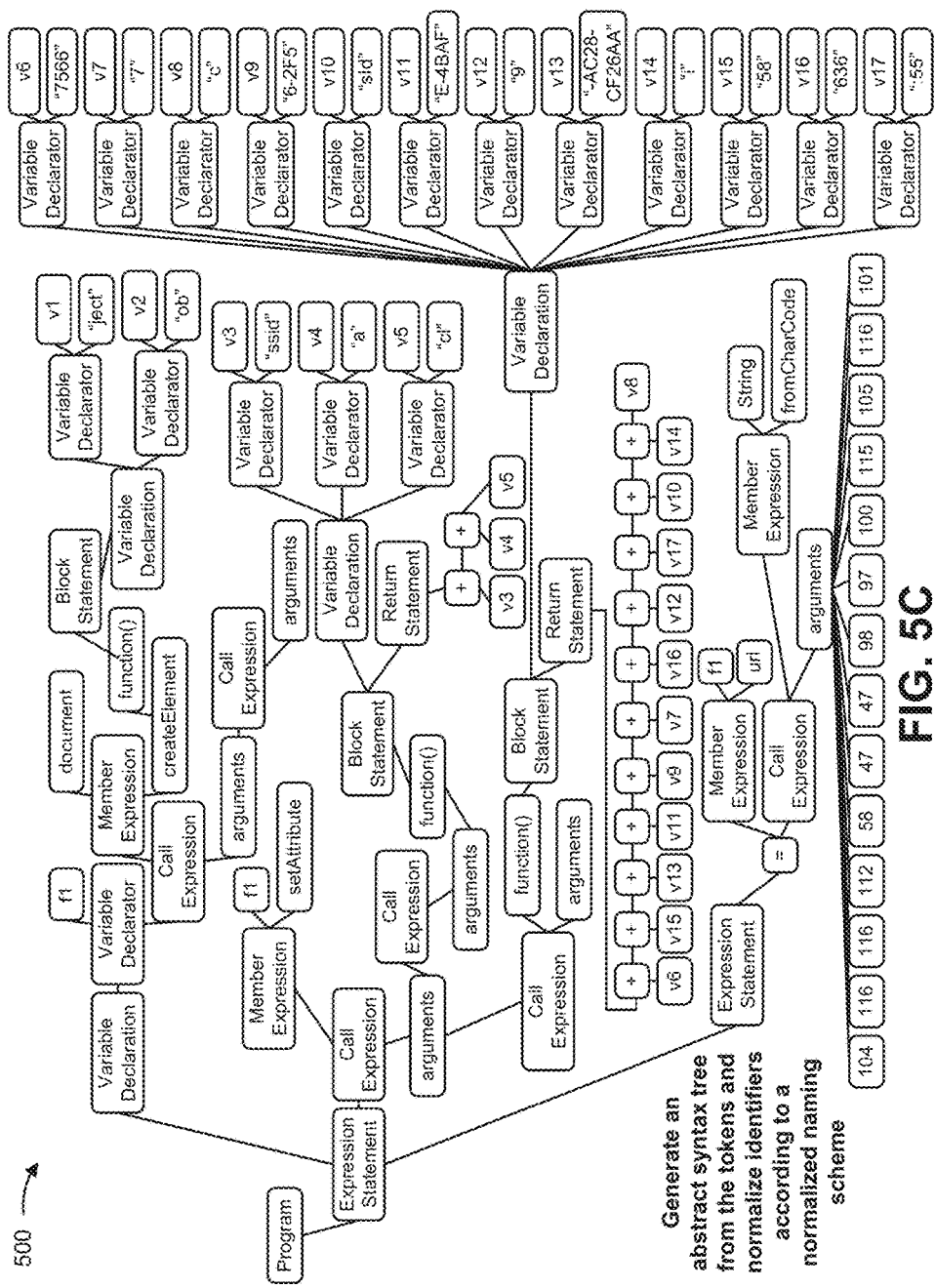

As shown in FIG. 5C, assume, for example implementation 500, that the network device generates an abstract syntax tree (AST) by creating nodes based on the tokens identified from the script. Assume further that the network device renames the local variables/functions based on a standardized naming scheme (e.g., 'v' plus a sequential number for variables and 'f' plus a sequential number for functions) and the location of a node associated with a variable/function (numbering in order of traversal from root to branches). In this way, the network device may use the AST to reduce storage size and processing load while mitigating obfuscation by variable/function renaming.

Figure 5D:
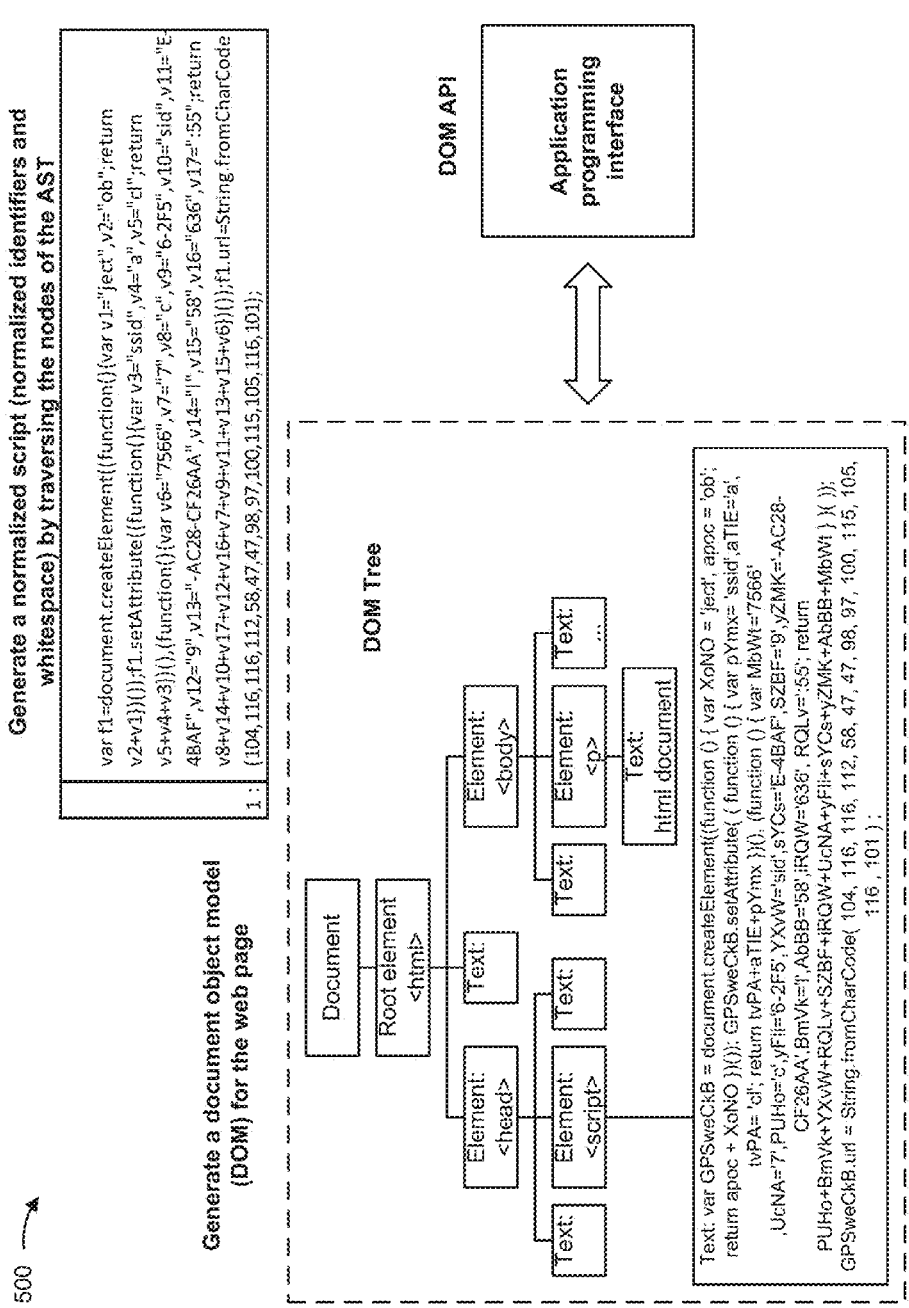

As shown in FIG. 5D, assume, for example implementation 500, that the network device generates, by traversing the nodes of the AST, a normalized script having normalized identifiers (as described with respect to FIG. 5C). Assume further that the network device, when generating the normalized script, inserts whitespace according to a particular scheme for inserting whitespace (e.g., a scheme directing the network device to insert only the minimum whitespace required to maintain the script's interpretation), resulting in a normalized script having normalized whitespace. In this way, the network device may match the normalized script to a regular expression signature using less memory and fewer processor resources than if the network device were to use the original script for matching, while standardizing the naming scheme to defeat renaming obfuscation techniques.

As also shown in FIG. 5D, assume, for example implementation 500, that the network device has determined that dynamic de-obfuscation is to be performed. Assume further that the network device identifies an API and, based on the API, generates a DOM tree which represents the HTML context and includes the normalized JavaScript. In this way, the network device may initialize an emulator with an appropriate DOM for running a traced interpretation of the script.

As shown in FIG. 5E, assume, for example implementation 500, that the network device interprets the normalized script, using the emulator, within an emulated environment based on the DOM. Assume further that network device 230 tracks function calls, arguments, returned values, the DOM tree, variable values, and/or other information in a trace. Using the emulator, the network device may determine that the local variables represent split literal strings and may evaluate the concatenation of the split strings as "object," "classid," and "clsid:55963676-2F5E-4BAF-AC28-CF26AA587566;" that the fromCharCode function operates with literal numeric value arguments and may evaluate the returned value of the function as "http://badsite;" and that the JavaScript script creates a new object in the DOM tree having the aforementioned classid and url as parameters.

As shown in FIG. 5F, assume that, based on the trace, the network device optimizes the AST to concatenate the identified split literal strings, replace constant functions with literal equivalents, propagate constants, and substitute called functions for local alias functions which call the called functions. Assume that the network device generates an optimized normalized script based on the optimized normalized AST. In this way, the network device may further reduce the memory and/or processor requirements of the signature matching process as well as revert certain forms of data obfuscation in the script to reduce the odds of false negatives (i.e., not matching an obfuscated malicious script to a signature).

Assume further that the network device generates a method call list based on the trace. Assume further that the method call list identifies three external methods as having been called by the script to interact with the DOM: "createElement," "setAttribute," and "fromCharCode" as well as a call count associated with each (1 for all three) and arguments passed to each (inline/no arguments for "createElement" and "setAttribute;" 14 numeric values for from-CharCode). By generating the method call list, the network device may provide another context for which a signature may be generated/matched to identify a malicious script.

As shown in FIG. 5G, assume, for example implementation 500, that the network device determines whether the normalized script, without dynamic de-obfuscation, matches a first regular expression signature ("REGEX1=var f1=document\.createElement\(\(function\(\) {var var1=["]"). Assume further that the network device matches the first regular expression signature at the beginning of the normalized JavaScript and thereby determines that the data is to be treated as having a malicious script.

As further shown in FIG. 5G, assume that the network device determines whether the normalized script, with dynamic de-obfuscation, matches a second regular expression signature ("REGEX2=55963676-2F5E-4BAF-AC28-CF26AA587566") or a third regular expression signature ("REGEX3=badsite"). Assume further that the network device matches the second and third regular expression signatures to the normalized dynamically de-obfuscated script and thereby confirms that the data is to be treated as having a malicious script.

As further shown in FIG. 5G, assume that the network device determines whether the method call list matches a fourth regular expression signature ("REGEX4=fromCharCode [0-9]+\<[0-9]+numeric value"). Assume further that the network device matches the fourth regular expression signature to the method call list and thereby confirms that the data is to be treated as having a malicious script.

In this way, the network device may identify and/or confirm the identification of a malicious script based on one or more regular expression signatures matching one or more scripts and/or a method call list. As shown in FIG. 5G, the network device may select a particular regular expression signature or a particular set of regular expression signatures based on whether the signature is to be matched to a non-dynamically de-obfuscated normalized script, a dynamically de-obfuscated normalized script, or to a method call list.

Figure 5H:
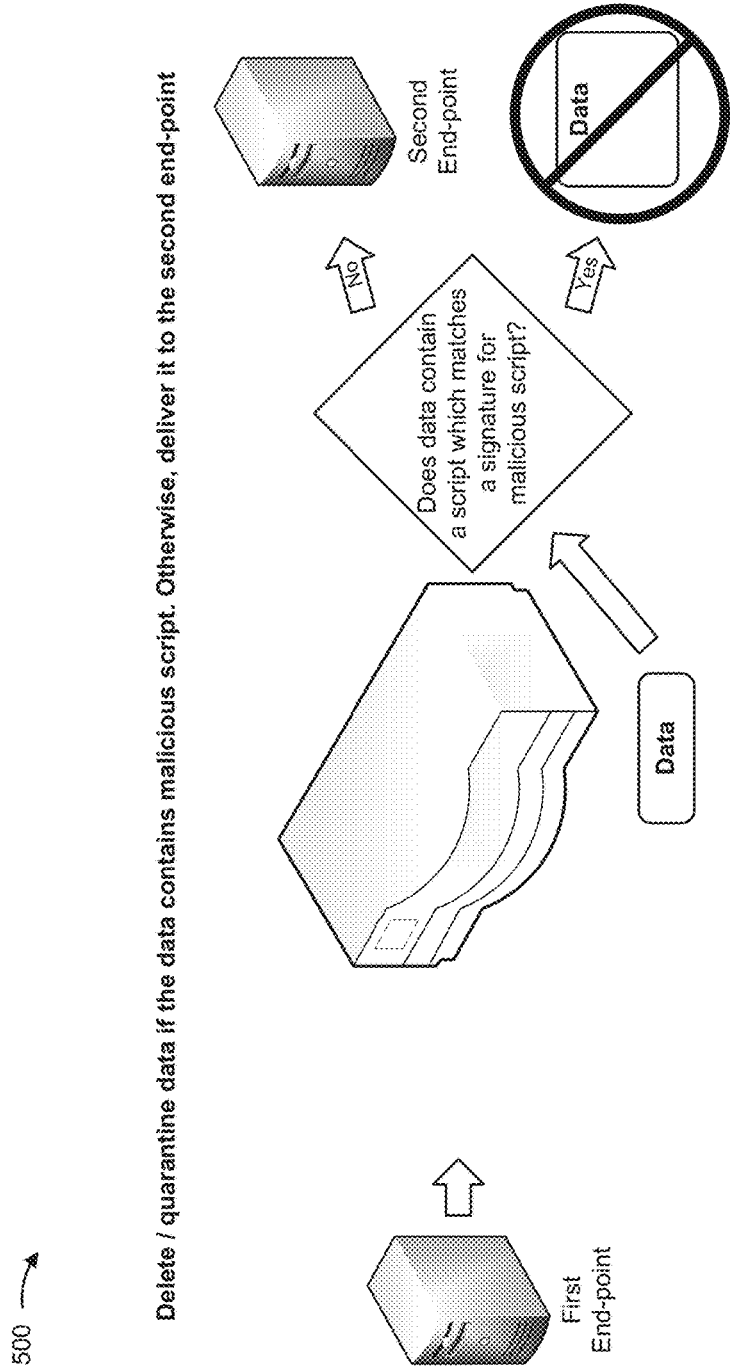

As shown in FIG. 5H, network device 230 may, based on determining whether the script matches a signature for a malicious script, delete/quarantine the data received from sending end-point device 210 (if the script matches a signature) or deliver the data to the receiving end-point device 220 (if the script does not match a signature). In this way, network device 230 may enable receiving end-point device 220 to seamlessly send and receive data to and from sending end-point device 210 (as well as other potentially dangerous/untrusted sources) while mitigating the risk of transferring a malicious script.

As indicated above, FIGS. 5A-5H are provided merely as an example. Other examples are possible and may differ from what was described with regard to FIGS. 5A-5H.

Implementations described herein provide an intrusion detection and protection system which inspects data passing through a device, identifies a script and a context associated with the script, normalizes whitespace and identifier naming, de-obfuscates the script, traces the interpretation of the script in an emulated environment, and matches the normalized/de-obfuscated script—and other trace information—to a regular expression signature for a script that has been identified as being malicious. Implementations described herein may also be used to assist a user in generating a regular expression signature to be matched against a script.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method comprising:
   receiving, by a network device, data from an end-point device;
   identifying, by the network device, a script based on the data;
   determining, by the network device, a list of calls to functions based on the script,
      the functions being defined outside of the script;
   determining, by the network device, that the list of calls to the functions does not match a signature;
   identifying, by the network device, a particular portion of the script that does not affect a behavior of the script;
   determining, by the network device, an optimized script for the script based on determining that the list of calls to the functions does not match the signature,
      where determining the optimized script comprises:
         removing, from the script, the particular portion of the script that does not affect the behavior of the script; and
   processing, by the network device, the data based on the optimized script.

2. The method of claim 1, further comprising:
   identifying one or more loops of the script based on interpretation of a constant expression at runtime,
      where determining the optimized script comprises:
         removing, from the script, the one or more loops to obtain the optimized script.

3. The method of claim 1, further comprising:
   identifying a substitute function for the script,
      where determining the optimized script comprises:
         determining the optimized script based on the substitute function.

4. The method of claim 1, further comprising:
   performing an optimization on a syntax tree that represents the script,
      where determining the optimized script comprises:
         determining the optimized script based on performing the optimization on the syntax tree.

5. The method of claim 1, further comprising:
   determining that the optimized script matches the signature,
      where processing the data comprises:
         processing the data based on determining that the optimized script matches the signature.

6. The method of claim 1, further comprising:
   determining that the optimized script does not match the signature; and
   determining, based on the optimized script, whether the script behaves maliciously after determining that the optimized script does not match the signature,
      where processing the data comprises:
         processing the data based on determining whether the script behaves maliciously.

7. The method of claim 1, further comprising:
   determining, based on the optimized script, that the script behaves maliciously; and
   generating one or more signatures for one or more of the list of calls or the optimized script based on determining that the script behaves maliciously.

8. The method of claim 1, where identifying the script comprises:
   identifying a context within the data, and
   identifying the script associated with the context.

9. A non-transitory computer readable-medium storing instructions, the instructions comprising:
   one or more instructions that, when executed by at least one processor, cause the at least one processor to:
      receive data from a device;
      identify a script based on the data;
      determine a list of calls to functions based on the script, the functions being defined outside of the script;
      determine that the list of calls to the functions does not match a signature;
      determine an optimized script for the script based on determining that the list of calls to the functions does not match the signature and by removing, from the script, one or more of constant values or functions that return the constant values; and
      process the data based on the optimized script.

10. The non-transitory computer readable-medium of claim 9,
   where the instructions further comprise:
      one or more instructions that, when executed by the at least one processor, cause the at least one processor to:

determine to perform dynamic de-obfuscation of the script, and where the one or more instructions to determine the list of calls to the functions comprise:
one or more instructions that, when executed by the at least one processor, cause the at least one processor to:
determine the list of calls to the functions based on the script and based on determining to perform the dynamic de-obfuscation the script.

11. The non-transitory computer readable-medium of claim 9, where the instructions further comprise:
one or more instructions that, when executed by the at least one processor, cause the at least one processor to:
determine, based on the optimized script, that the script behaves maliciously; and
modify the signature based on determining that the script behaves maliciously.

12. The non-transitory computer readable-medium of claim 9, where the instructions further comprise:
one or more instructions that, when executed by the at least one processor, cause the at least one processor to:
identify a portion of the script does not affect behavior of the script; and
remove, from the script, the portion to obtain the optimized script.

13. The non-transitory computer readable-medium of claim 9, where the instructions further comprise:
one or more instructions that, when executed by the at least one processor, cause the at least one processor to:
identify one or more loops of the script based on interpretation of a constant expression at runtime; and
remove, from the script, the one or more loops to obtain the optimized script.

14. The non-transitory computer readable-medium of claim 9,
where the instructions further comprise:
one or more instructions that, when executed by the at least one processor, cause the at least one processor to:
determine that the optimized script matches the signature, and where the one or more instructions to process the data comprise:
one or more instructions that, when executed by the at least one processor, cause the at least one processor to:
process the data based on determining that the optimized script matches the signature.

15. The non-transitory computer readable-medium of claim 9, where the one or more instructions to identity the script comprise:
one or more instructions that, when executed by the at least one processor, cause the at least one processor to:
identify a context within the data, and
identify the script associated with the context, the context including a web page, and
the script including an element defined within tags of the web page.

16. A system comprising:
a memory; and
one or more processors, at least partially implemented in hardware, to:
receive data from a device;
identify a script based on the data;
determine a list of calls to functions based on the script, the functions being defined outside of the script;
determine that the list of calls to the functions does not match a signature;
identify a substitute function for the script;
determine an optimized script for the script based on determining that the list of calls to the functions does not match the signature and based on the substitute function,
where, when determining the optimized script, the one or more processors are to:
substitute a function in the script with the substitute function; and
process the data based on the optimized script.

17. The system of claim 16,
where the one or more processors are further to:
determine that the optimized script does not match the signature; and
determine, based on the optimized script, whether the script behaves maliciously after determining that the optimized script does not match the signature, and
where, when processing the data, the one or more processors are to:
process the data based on determining whether the script behaves maliciously.

18. The system of claim 16, where the one or more processors are further to:
determine, based on the optimized script, that the script behaves maliciously; and
generate one or more signatures for one or more of the list of calls or the optimized script based on determining that the script behaves maliciously.

19. The system of claim 16,
where the one or more processors are further to:
determine to perform dynamic de-obfuscation of the script, and
where, when determining the list of calls to the functions, the one or more processors are to:
determine the list of calls to the functions based on the script and based on determining to perform the dynamic de-obfuscation the script.

20. The system of claim 16, where, when determining the optimized script, the one or more processors are further to:
remove, from the script and to obtain the optimized script, one or more of constant values or functions that return the constant values.

* * * * *